US009595825B2

(12) United States Patent
Curt

(10) Patent No.: US 9,595,825 B2
(45) Date of Patent: Mar. 14, 2017

(54) METHOD AND APPARATUS FOR SMART CIRCUIT BREAKER

(75) Inventor: Walter Curt, Harrisonburg, VA (US)

(73) Assignee: POWER MONITORS, INC., Mount Crawford, VA (US)

(*) Notice: Subject to any disclaimer, the term of this patent is extended or adjusted under 35 U.S.C. 154(b) by 0 days.

(21) Appl. No.: 11/971,469

(22) Filed: Jan. 9, 2008

(65) Prior Publication Data

US 2008/0167755 A1  Jul. 10, 2008

Related U.S. Application Data

(60) Provisional application No. 60/884,119, filed on Jan. 9, 2007.

(51) Int. Cl.
H02H 3/42 (2006.01)
G07F 15/00 (2006.01)
H02J 13/00 (2006.01)

(52) U.S. Cl.
CPC .......... *H02H 3/42* (2013.01); *G07F 15/003* (2013.01); *H02J 13/002* (2013.01);
(Continued)

(58) Field of Classification Search
CPC ......... H02J 3/00; G06Q 50/06; G06Q 20/102; H01H 71/74; H01H 71/125; G01R 19/2513;
(Continued)

(56) References Cited

U.S. PATENT DOCUMENTS 2,855,916 A  10/1958 Foster
3,516,063 A   6/1970 Arkin et al.
(Continued)

FOREIGN PATENT DOCUMENTS

CN  2175937 Y  8/1994
CN  2366855 Y  3/2000
(Continued)

OTHER PUBLICATIONS

Jordan, S. (2006). Commercial lighting control 101. Electrical Wholesaling, 87(9), NA. Retrieved from http://dialog.proquest.com/professional/docview/668452066?accountid=142257.*
(Continued)

*Primary Examiner* — Michael Harrington
(74) *Attorney, Agent, or Firm* — Baker Hostetler LLP

(57) ABSTRACT

A smart circuit breaker is provided. An electronic device can be electrically positioned between a utility and an electrical power outlet, electrical subpanel, load center, transformer, or other power distribution center. The electronic device can include a circuit breaker associated with an electrical power circuit, a communications device, a monitoring device and an electronic circuit. The electronic circuit can be operable with the circuit breaker, the communications device and the monitoring device to determine an account of a user of the electrical power circuit and to determine from the account whether to supply power to the electrical power circuit. Further, the electronic circuit can be operable with the circuit breaker, the communications device and the monitoring device to, if power is supplied to the electrical power circuit, charge the account and activate the circuit breaker if the monitoring device detects an undesirable power condition.

19 Claims, 3 Drawing Sheets

(52) U.S. Cl.
CPC ....... *H02J 13/0075* (2013.01); *Y02B 90/2615* (2013.01); *Y02B 90/2653* (2013.01); *Y02E 60/7815* (2013.01); *Y02E 60/7853* (2013.01); *Y04S 40/121* (2013.01); *Y04S 40/126* (2013.01)

(58) Field of Classification Search
CPC ...... G01R 31/025; H04L 12/10; G01D 4/006; Y04S 20/40; Y04S 20/46; Y04S 10/30; Y04S 10/40; Y04S 40/12; Y04S 40/121; Y04S 40/126
USPC .............. 705/412, 62; 702/62; 700/286, 295
See application file for complete search history.

(56) References Cited

U.S. PATENT DOCUMENTS

| | | |
|---|---|---|
| 4,067,054 A | 1/1978 | Clark |
| 4,540,182 A | 9/1985 | Clement |
| 4,558,275 A | 12/1985 | Borowy et al. |
| 4,731,574 A | 3/1988 | Melbert |
| 4,731,575 A | 3/1988 | Sloan |
| 4,800,492 A | 1/1989 | Johnson et al. |
| 5,083,638 A | 1/1992 | Schneider |
| 5,107,202 A | 4/1992 | Renda |
| 5,241,283 A | 8/1993 | Sutterlin |
| 5,410,735 A | 4/1995 | Borchardt et al. |
| 5,420,799 A | 5/1995 | Peterson et al. |
| 5,488,202 A | 1/1996 | Baitz et al. |
| 5,491,463 A | 2/1996 | Sargeant et al. |
| 5,565,783 A | 10/1996 | Lau et al. |
| 5,583,801 A | 12/1996 | Croyle et al. |
| 5,602,794 A | 2/1997 | Javanifard et al. |
| 5,617,286 A | 4/1997 | Jenkins |
| 5,641,898 A | 6/1997 | Chang |
| 5,659,453 A | 8/1997 | Russell et al. |
| 5,725,062 A | 3/1998 | Fronek |
| 5,726,646 A | 3/1998 | Bane et al. |
| 5,732,039 A | 3/1998 | Javanifard et al. |
| 5,752,046 A | 5/1998 | Oprescu et al. |
| 5,767,735 A | 6/1998 | Javanifard et al. |
| 5,781,473 A | 7/1998 | Javanifard et al. |
| 5,796,631 A | 8/1998 | Iancu et al. |
| 5,831,538 A | 11/1998 | Schena |
| 5,898,158 A | 4/1999 | Shimizu et al. |
| 5,905,616 A | 5/1999 | Lyke |
| 5,937,386 A | 8/1999 | Frantz |
| 5,939,974 A | 8/1999 | Heagle et al. |
| 5,943,226 A | 8/1999 | Kim |
| 6,005,758 A | 12/1999 | Spencer et al. |
| 6,022,315 A | 2/2000 | Iliff |
| 6,034,859 A | 3/2000 | Baumgärtl |
| 6,049,880 A | 4/2000 | Song |
| 6,091,337 A | 7/2000 | Arshad et al. |
| 6,107,862 A | 8/2000 | Mukainakano et al. |
| 6,115,695 A | 9/2000 | Kern |
| 6,151,229 A | 11/2000 | Taub et al. |
| 6,169,406 B1 | 1/2001 | Peschel |
| 6,195,243 B1* | 2/2001 | Spencer ................. H02H 3/00 361/64 |
| 6,212,049 B1 | 4/2001 | Spencer et al. |
| 6,222,443 B1 | 4/2001 | Beeson et al. |
| 6,307,425 B1 | 10/2001 | Chevallier et al. |
| 6,313,394 B1 | 11/2001 | Shugar et al. |
| 6,317,031 B1 | 11/2001 | Rickard |
| 6,356,426 B1 | 3/2002 | Dougherty |
| 6,360,177 B1 | 3/2002 | Curt et al. |
| 6,369,642 B1 | 4/2002 | Zeng |
| 6,384,348 B1 | 5/2002 | Haga et al. |
| 6,415,244 B1 | 7/2002 | Dickens et al. |
| 6,437,692 B1 | 8/2002 | Petite et al. |
| 6,545,482 B1 | 4/2003 | Fedirchuk et al. |
| 6,545,529 B2 | 4/2003 | Kim |
| 6,603,218 B1* | 8/2003 | Aisa .................. 307/31 |
| 6,628,496 B2 | 9/2003 | Montjean |
| 6,633,163 B2 | 10/2003 | Fling |
| 6,633,823 B2 | 10/2003 | Bartone et al. |
| 6,647,024 B1 | 11/2003 | Dombkowski et al. |
| 6,653,945 B2 | 11/2003 | Johnson et al. |
| 6,687,680 B1 | 2/2004 | Iguchi et al. |
| 6,690,594 B2 | 2/2004 | Amarillas et al. |
| 6,704,568 B2 | 3/2004 | Montjean |
| 6,734,682 B2 | 5/2004 | Tallman et al. |
| 6,789,206 B1 | 9/2004 | Wierzbicki et al. |
| 6,792,337 B2 | 9/2004 | Blackett et al. |
| 6,836,099 B1 | 12/2004 | Amarillas et al. |
| 6,842,719 B1 | 1/2005 | Fitzpatrick et al. |
| 6,866,193 B1 | 3/2005 | Shimizu et al. |
| 6,912,678 B1 | 6/2005 | Floro et al. |
| 6,928,564 B2 | 8/2005 | Tada et al. |
| 6,931,445 B2 | 8/2005 | Davis |
| 6,944,058 B2 | 9/2005 | Wong |
| 6,957,158 B1 | 10/2005 | Hancock et al. |
| 6,961,641 B1 | 11/2005 | Forth et al. |
| 6,993,417 B2 | 1/2006 | Osann, Jr. |
| 6,995,603 B2 | 2/2006 | Chen et al. |
| 7,004,784 B2 | 2/2006 | Castle |
| 7,009,379 B2 | 3/2006 | Ramirez |
| 7,130,722 B2* | 10/2006 | Soni ................. 700/286 |
| 7,135,850 B2 | 11/2006 | Ramirez |
| 7,177,824 B2 | 2/2007 | Sabongi et al. |
| 7,242,109 B2 | 7/2007 | Beeren |
| 7,348,769 B2 | 3/2008 | Ramirez |
| 7,460,467 B1 | 12/2008 | Corcoran |
| 7,462,952 B1 | 12/2008 | Bailey |
| 7,486,782 B1* | 2/2009 | Roos .................. 379/106.03 |
| 7,769,149 B2 | 8/2010 | Berkman |
| 7,795,877 B2 | 9/2010 | Radtke et al. |
| 7,804,280 B2 | 9/2010 | Deaver, Sr. et al. |
| 7,956,673 B2 | 6/2011 | Pan |
| 2002/0008566 A1 | 1/2002 | Taito et al. |
| 2002/0036430 A1* | 3/2002 | Welches ................. F02G 1/043 307/18 |
| 2002/0043969 A1 | 4/2002 | Duncan et al. |
| 2002/0063635 A1 | 5/2002 | Shincovich |
| 2002/0072868 A1* | 6/2002 | Bartone et al. ................. 702/62 |
| 2002/0082924 A1 | 6/2002 | Koether |
| 2002/0112250 A1 | 8/2002 | Koplar et al. |
| 2002/0130701 A1 | 9/2002 | Kleveland |
| 2002/0143482 A1 | 10/2002 | Karanam et al. |
| 2002/0182570 A1 | 12/2002 | Croteau et al. |
| 2003/0046377 A1 | 3/2003 | Daum et al. |
| 2003/0069796 A1 | 4/2003 | Elwood et al. |
| 2003/0126735 A1 | 7/2003 | Taniguchi et al. |
| 2003/0167178 A1* | 9/2003 | Jarman et al. ................. 705/1 |
| 2003/0197989 A1 | 10/2003 | Nojima |
| 2003/0224784 A1 | 12/2003 | Hunt et al. |
| 2003/0225713 A1* | 12/2003 | Atkinson et al. ............. 705/412 |
| 2004/0008023 A1 | 1/2004 | Jang et al. |
| 2004/0024913 A1 | 2/2004 | Ikeda et al. |
| 2004/0124247 A1 | 7/2004 | Watters |
| 2004/0128085 A1 | 7/2004 | Ramirez |
| 2004/0138786 A1 | 7/2004 | Blackett et al. |
| 2004/0138835 A1 | 7/2004 | Ransom et al. |
| 2004/0210621 A1 | 10/2004 | Antonellis |
| 2004/0242087 A1 | 12/2004 | Hoshina |
| 2005/0049921 A1 | 3/2005 | Tengler et al. |
| 2005/0052186 A1 | 3/2005 | Grube |
| 2005/0138432 A1 | 6/2005 | Ransom et al. |
| 2005/0144099 A1 | 6/2005 | Deb et al. |
| 2005/0154490 A1 | 7/2005 | Blaine et al. |
| 2005/0154499 A1 | 7/2005 | Aldridge et al. |
| 2005/0201190 A1* | 9/2005 | Kowalski ................. H02G 3/00 365/51 |
| 2005/0212526 A1 | 9/2005 | Blades |
| 2005/0216349 A1 | 9/2005 | Vaseloff et al. |
| 2005/0256774 A1 | 11/2005 | Clothier et al. |
| 2005/0273183 A1 | 12/2005 | Curt et al. |
| 2006/0047543 A1 | 3/2006 | Moses |
| 2006/0052906 A1* | 3/2006 | Kates ................. H04L 47/10 700/295 |
| 2006/0061480 A1 | 3/2006 | Bowman |
| 2006/0062400 A1 | 3/2006 | Chia-Chun |
| 2006/0071776 A1 | 4/2006 | White, II et al. |

(56) References Cited

U.S. PATENT DOCUMENTS

| | | | |
|---|---|---|---|
| 2006/0087322 A1 | 4/2006 | McCollough, Jr. | |
| 2006/0087783 A1 | 4/2006 | Holley | |
| 2006/0098371 A1 | 5/2006 | Wambsganss et al. | |
| 2006/0111040 A1 | 5/2006 | Jenkins et al. | |
| 2006/0114121 A1 | 6/2006 | Cumeralto et al. | |
| 2006/0145685 A1 | 7/2006 | Ramirez | |
| 2006/0158177 A1 | 7/2006 | Ramirez | |
| 2006/0176630 A1 | 8/2006 | Carlino et al. | |
| 2006/0181838 A1* | 8/2006 | Ely .............................. | 361/622 |
| 2006/0190140 A1 | 8/2006 | Soni | |
| 2006/0190209 A1 | 8/2006 | Odom | |
| 2006/0218057 A1 | 9/2006 | Fitzpatrick et al. | |
| 2006/0244518 A1 | 11/2006 | Byeon et al. | |
| 2006/0271244 A1 | 11/2006 | Cumming et al. | |
| 2006/0271314 A1 | 11/2006 | Hayes | |
| 2006/0344144 | 12/2006 | Fukuhara Tumaotsu et al. | |
| 2007/0010916 A1* | 1/2007 | Rodgers et al. .............. | 700/295 |
| 2007/0053216 A1 | 3/2007 | Alenin | |
| 2007/0055889 A1* | 3/2007 | Henneberry et al. ......... | 713/186 |
| 2007/0064622 A1 | 3/2007 | Bi et al. | |
| 2007/0080819 A1 | 4/2007 | Marks et al. | |
| 2007/0126569 A1 | 6/2007 | Dagci | |
| 2007/0129087 A1 | 6/2007 | Bell | |
| 2007/0188954 A1* | 8/2007 | Wiese .................... | H02H 3/006 361/62 |
| 2007/0286089 A1 | 12/2007 | Nasle et al. | |
| 2007/0290845 A1 | 12/2007 | Benjelloun et al. | |
| 2008/0024096 A1 | 1/2008 | Pan | |
| 2008/0030317 A1 | 2/2008 | Bryant | |
| 2008/0042731 A1 | 2/2008 | Daga et al. | |
| 2008/0082275 A1* | 4/2008 | Caggiano ............. | G01R 15/146 702/61 |
| 2008/0106425 A1 | 5/2008 | Deaver et al. | |
| 2008/0159244 A1 | 7/2008 | Hunziker | |
| 2008/0224617 A1 | 9/2008 | Keller et al. | |
| 2008/0249723 A1 | 10/2008 | McAllister et al. | |
| 2009/0102680 A1* | 4/2009 | Roos ........................ | 340/870.02 |
| 2009/0115426 A1 | 5/2009 | Muench, Jr. et al. | |
| 2009/0146839 A1 | 6/2009 | Reddy et al. | |
| 2009/0167308 A1 | 7/2009 | Lomes | |
| 2009/0167418 A1 | 7/2009 | Raghavan | |
| 2009/0296488 A1 | 12/2009 | Nguyen et al. | |
| 2010/0074034 A1 | 3/2010 | Cazzaniga | |
| 2010/0244935 A1 | 9/2010 | Kim et al. | |
| 2012/0139335 A1 | 6/2012 | Holland | |
| 2012/0154023 A1 | 6/2012 | Pan et al. | |
| 2012/0181095 A1 | 7/2012 | Lopez | |

FOREIGN PATENT DOCUMENTS

| | | |
|---|---|---|
| CN | 1180382 C | 12/2004 |
| DE | 102007026290 | 7/2008 |
| EP | 0382929 | 12/1989 |
| EP | 0780515 | 6/1997 |
| FR | 2 797 356 | 2/2001 |
| FR | 2797356 | 2/2001 |
| JP | S64-041540 | 2/1989 |
| JP | 2154157 | 6/1990 |
| JP | 6-74783 | 3/1994 |
| JP | 6074783 | 3/1994 |
| JP | H07-032000 | 2/1995 |
| JP | 08101246 | 4/1996 |
| JP | 09107318 | 4/1997 |
| JP | 10271651 | 10/1998 |
| JP | 2000171492 | 6/2000 |
| JP | 2002199625 | 7/2002 |
| JP | 2002199625 A2 | 7/2002 |
| JP | 20020199625 | 7/2002 |
| JP | 2003069731 | 7/2003 |
| JP | 2004088771 | 3/2004 |
| JP | 2004320228 | 11/2004 |
| JP | 2005190481 | 7/2005 |
| JP | 2005190481 A2 | 7/2005 |
| JP | 2006344144 | 12/2006 |
| JP | 2006344144 A2 | 12/2006 |
| JP | 2007020268 | 1/2007 |
| JP | 2007214784 | 8/2007 |
| WO | WO0106336 | 1/2001 |
| WO | WO2006132757 | 12/2006 |
| WO | WO2007116835 | 10/2007 |

OTHER PUBLICATIONS

Chinese Office Action for Appl. No. 200880005285.0 dated Nov. 14, 2012 (8 pages).
Chinese Office Action issued on Jul. 6, 2010 Chinese Patent Appl. No. 200780015356.0 (10 pages).
Communication Cable Inflator/Gas Pressure Centralized Monitoring and Management System, on pp. 44-46, 49 in No. 2 vol. 18 of Automation Techniques and Application in Hellongjiang—Summary attached to Chinese Office Action for Appl. No. 200780015356.0 dated Jul. 6, 2010 as Reference No. 1—See p. 7 (1 page).
European Examination Report issued on Feb. 5, 2011 for European Patent Appl. No. 07 758 717.8-2006 (4 pages).
Chinese Office Action issued on Sep. 28, 2011 for Chinese Patent Appl. No. 200880005285.0 (16 pages).
Chinese Office Action issued on Nov. 14, 2012 for Chinese Patent Appl. No. 200880005285.0 (8 pages).
International Search Report and Written Opinion issued on Jul. 8, 2008 for International Patent Appl. No. PCT/US08/50583 (11 pages).
International Search Report and Written Opinion issued on Jul. 7, 2008 for International Patent Appl. No. PCT/US04/32880 (9 pages).
International Search Report and Written Opinion issued on Feb. 11, 2008 for International Patent Appl. No. PCT/US07/64196 (9 pages).
International Search Report and Written Opinion issued on Mar. 3, 2008 for International Patent Appl. No. PCT/US07/77418 (9 pages).
International Search Report and Written Opinion issued on Jul. 23, 2008 for International Patent Appl. No. PCT/US08/55613 (7 pages).
International Search Report and Written Opinion issued on Jul. 31, 2008 for International Patent Appl. No. PCT/US08/56008 (10 pages).
International Search Report and Written Opinion issued on Sep. 26, 2008 for International Patent Appl. No. PCT/US08/70879 (8 pages).
International Search Report and Written Opinion issued on Oct. 3, 2008 for International Patent Appl. No. PCT/US08/70881 (8 pages).
International Search Report and Written Opinion issued on May 8, 2009 for International Patent Appl. No. PCT/US09/35693 (5 pages).
Japanese Office Action issued on Sep. 4, 2012 for Japanese Patent Appl. No. P2009-545014 (8 pages).
Japanese Office Action issued on Feb. 14, 2012 for Japanese Patent Appl. No. P2009-500631 (6 pages).
International Search Report and Written Opinion issued on Jun. 3, 2008 for International Patent Appl. No. PCT/US04/26874 (5 pages).
International Search Report and Written Opinion issued on Nov. 2, 2005 for International Patent Appl. No. PCT/US04/32878 (5 pages).
Chinese Office Action issued on May 29, 2013 for Chinese Patent Appl. No. 200880005285.0—19 pages.
Japanese Office Action for Appl. No. P2009-545014 dated Sep. 4, 2012 (4 pages).
Extended European Search Report for Patent Application No. 08713661.01, mailed May 26, 2014 (7 pages).
Chinese Office Action issued on Jan. 15, 2014 for Chinese Patent Appl. No. 200880005285.0 (6 pages).
Chinese Office Action issued on May 5, 2014 for Chinese Patent Appl. No. 200880005285.0 (6 pages).

* cited by examiner

METHOD AND APPARATUS FOR SMART CIRCUIT BREAKER

RELATED APPLICATIONS

This application claims the benefit of U.S. Provisional Patent Application Ser. No. 60/884,119 entitled "METHOD AND APPARATUS FOR SMART CIRCUIT BREAKER" and filed on Jan. 9, 2007, the entire contents of which is hereby incorporated by reference.

BACKGROUND

Many business and residential facilities have a master meter with one or more sub-circuits for each individual business, room, apartment, etc. Further, many public places have publicly available power outlets. Such arrangements can be inefficient.

SUMMARY

In one embodiment, a smart circuit breaker is provided. In one embodiment, an electronic device is electrically positioned between a utility (i.e., a utility or power company or provider) and an electrical power outlet, electrical subpanel, load center, transformer, or other power distribution center. The electronic device includes a circuit breaker associated with an electrical power circuit, a communications device, a monitoring device and an electronic circuit. The electronic circuit is operable with the circuit breaker, the communications device and the monitoring device to determine an account of a user of the electrical power circuit and to determine from the account whether to supply power to the electrical power circuit. Further, the electronic circuit is operable with the circuit breaker, the communications device and the monitoring device to, if power is supplied to the electrical power circuit, charge the account and activate the circuit breaker if the monitoring device detects an undesirable power condition.

In one embodiment, the communications device is a power line communication device. In another embodiment, the electronic circuit is operable with the circuit breaker, the communications device and the monitoring device to determine the account by transmitting an identifier associated with the user to a database. In one embodiment, the identifier is entered by the user via a user interface. In another embodiment, the identifier is obtained from a card reader. In one embodiment, the electronic device functions as a utility power meter. In another embodiment, the electronic device is positioned between a utility power meter and a power outlet, electrical subpanel, load center, transformer, or other power distribution center.

In one embodiment, the electronic circuit is operable with the circuit breaker, the communications device and the monitoring device to determine to not supply power to the electrical power circuit if a balance of the account is below a threshold value. In another embodiment, the electronic circuit is operable with the circuit breaker, the communications device and the monitoring device to stop supplying power to the electrical power circuit if charging the account causes a balance of the account to meet a threshold condition.

In one embodiment, an electronic device is electrically positioned between a utility and an electrical power outlet, electrical subpanel, load center, transformer, or other power distribution center. The electronic device includes a circuit breaker associated with an electrical power circuit, a communications device, a monitoring device, and an electronic circuit. The electronic circuit is operable with the circuit breaker, the communications device and the monitoring device to identify a user of the electrical power circuit, supply power to the electrical power circuit after the user is identified, attribute to the user an amount of power usage based on the power supplied to the electrical power circuit after the user is identified, and activate the circuit breaker if the monitoring device detects an undesirable power condition.

In one embodiment, the communications device is a power line communication device. In another embodiment, the electronic circuit is operable with the circuit breaker, the communications device and the monitoring device to identify the user by transmitting an identifier associated with the user to a database. In one embodiment, the identifier is entered by the user via a user interface. In still another embodiment, the identifier is obtained from a card reader. In one embodiment, the electronic device functions as a utility power meter. In another embodiment, the electronic device is positioned between a utility power meter and a power outlet, electrical subpanel, load center, transformer, or other power distribution center.

In one embodiment, the electronic circuit is operable with the circuit breaker, the communications device and the monitoring device to determine to not supply power to the electrical power circuit if an account balance associated with the user meets a threshold condition. In another embodiment, the electrical power circuit is publicly accessible and the electrical power outlet is associated with the electrical power circuit. In still another embodiment, the electrical power outlet is located in a transportation terminal, an airport terminal, a parking facility, an office building, a restaurant, a retail facility, a book store, a government building, a college or university campus, a public park, a recreational vehicle park, or a community association common room or facility.

In one embodiment, an electronic system is electrically positioned between a utility and a plurality of electrical power outlets, electrical subpanels, load centers, transformers, or other power distribution centers. The system includes a first circuit breaker associated with a first electrical power circuit, a second circuit breaker associated with a second electrical power circuit, a communications device, a monitoring device, and an electronic circuit. The electronic circuit is operable with the first circuit breaker, the second circuit breaker, the communications device and the monitoring device to identify a user of the first electrical power circuit, attribute to the user a first amount of power usage based on a first amount of power supplied to the first electrical power circuit, attribute to the user a second amount of power usage based on a second amount of power supplied to the second electrical power circuit and a number of other users, the other users having been identified as users of the second electrical power circuit, activate the first circuit breaker if an undesirable power condition is detected for the first electrical power circuit, and activate the second circuit breaker if the undesirable power condition is detected for the second electrical power circuit.

In one embodiment, the communications device is a power line communication device. In another embodiment, the electronic circuit is operable with the first circuit breaker, the second circuit breaker, the communications device and the monitoring device to identify the user by transmitting an identifier associated with the user to a database. In one embodiment, the electronic device functions as a utility power meter. In another embodiment, the electronic device is positioned between a utility power meter and a power outlet, electrical subpanel, load center, transformer, or other power distribution center.

In one embodiment, the second electrical power circuit is associated with lighting of a location of the user. In still another embodiment, the second electrical power circuit is associated with climate control of a location of the user.

Additional features and advantages are described herein, and will be apparent from, the following Detailed Description and the figures.

DETAILED DESCRIPTION

Figure 1:
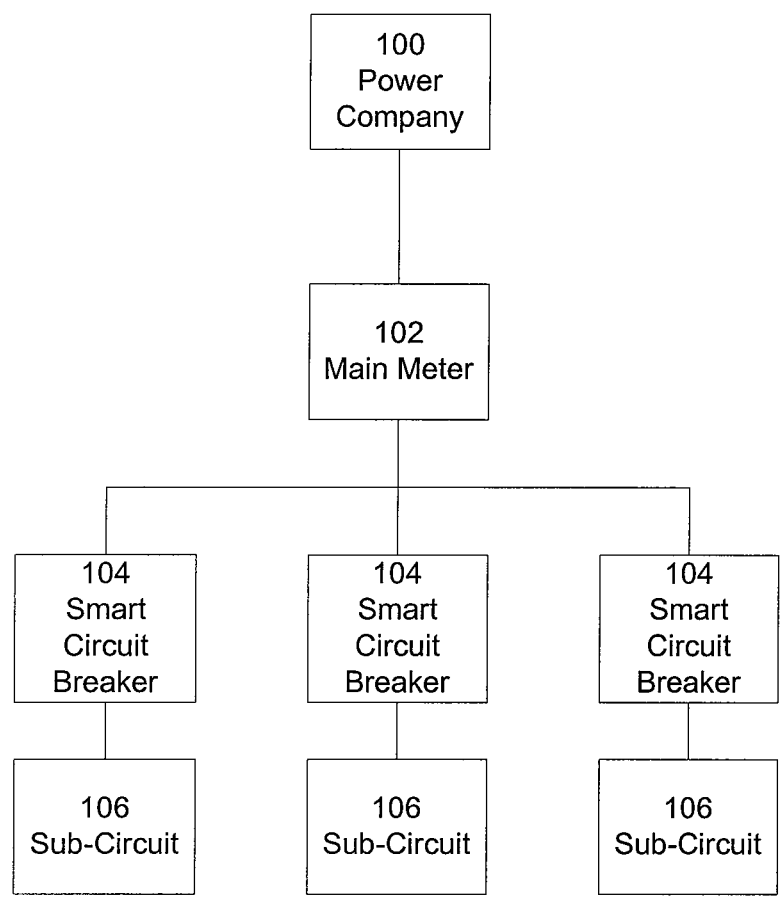
FIG. 1 is a block diagram of a circuit having smart circuit breakers in accordance with one embodiment.

In one embodiment, a smart circuit breaker is provided. The smart circuit breaker can replace the main and/or sub breaker for a business, apartment, or residence with a breaker that had one or more of the following features: kilowatt hour measurement of power consumption; power quality measurement; storage of data; breaker open on command, power quality conditions, payment time out; wireless communications, Bluetooth, ZigBee, mesh or any other suitable wireless communications capability; power line communications or any other suitable wired communications capability; RFID-type proximity card reading for payment and identification or any other suitable purpose; and ability to perform the function of a normal circuit breaker.

In one embodiment, the smart circuit breaker enables master metered but non-metered sub unit residential and business facilities to be metered by the owner on a panel by panel basis. In another embodiment, the smart circuit breaker enables utility metering without the external meter. In still another embodiment, the smart circuit breaker enables shutdown based on poor power quality. In yet another embodiment, the smart circuit breaker enables shutdown based on lack of payment.

In one embodiment, the owner, manager or operator of a multi-rental unit business or residence (e.g., a commercial building, an apartment complex, a private residence having a boarder or one or more children's rooms, a dormitory, etc.) can install a smart circuit breaker in one or more sub-panels (preferably each sub-panel). With at least the kW-hr feature or any other suitable feature, each breaker can monitor and store power consumption data for its sub-circuit. The data can be retrieved by any suitable interface (e.g., whichever interface is built into it, such as wireless, PLC, proximity, etc.). With the data retrieved, the retrieval system and software can prepare a bill for the particular apartment or business unit; however, billing can be managed in any suitable manner.

In another embodiment, utilities (i.e., utility companies) could use smart circuit breakers for monitoring and/or billing or any other suitable purpose instead of the external meters. In one embodiment, the utility company monitors/bills for a main meter, and an owner/manager/operator monitors/bills for power consumption of individual sub-circuits using smart circuit breakers.

In one embodiment, smart circuit breakers with RF proximity readers enable users to purchase power on cards (or any other suitable device) like phone cards and "load" that data into the breaker to allow operation. Examples of locations at which such a payment system might be implemented include camp grounds, remote lodges, college housing, hotels, motels, short-term living accommodations, etc. In one embodiment, a user's card is operable in a plurality of different locations.

In one embodiment, a smart circuit breaker incorporates power quality measurement, storage and open/close functions. If the smart circuit breaker measures high harmonic content or other out of range power quality parameters or any other suitable conditions, it is programmed to trip out the breaker to protect downstream electrical/electronic systems or perform any other suitable operation.

In one embodiment, smart circuit breakers use wireless or PLC mesh network technology or any other suitable communications systems and are located throughout a building or complex to provide room by room, circuit by circuit, floor by floor, and building by building data to a central system for control and/or analysis. In one embodiment, the system is coupled with downstream non-breaker measurement and control systems for expanded capability.

FIG. 1 illustrates a system including a smart circuit breaker in accordance with one embodiment. A power company 100 or electrical grid or other power providing system is electrically coupled to a utility power meter 102. The power meter 102 records the amount of power or electricity consumed or utilized by an electrical circuit (e.g., a circuit for a house, a building, a condo, an apartment, an outdoor area, etc.). Typically, the electrical circuit is associated with an account, and readings from the meter 102 are used to charge that account for all of the power consumed on the circuit, regardless of the actual user. However, if a smart circuit breaker 104 is placed between the utility power meter 102 and a sub-circuit 106, the smart circuit breaker can identify an actual user of its associated sub-circuit, enabling the account debit registered at the power meter 102 to be more equitably distributed to actual users (e.g., tenants, students, guests, members of the public accessing an electrical plug, etc.). In some cases, meter 102 may be eliminated when the smart breaker 104 is able to perform the same function. In another case, meter 102 may actually be another smart breaker 104 device.

Figure 2:
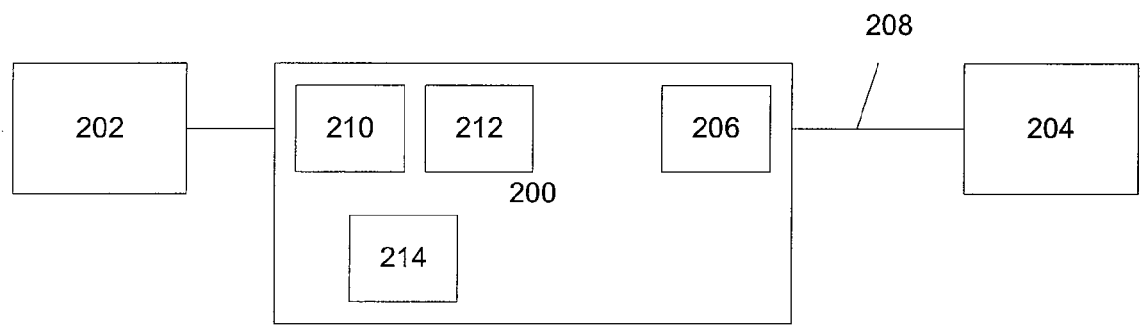
FIG. 2 is a block diagram of a smart circuit breaker in accordance with one embodiment.

FIG. 2 illustrates a system having a smart circuit breaker in accordance with one embodiment. An electronic device 200 (e.g., a smart circuit breaker) is electrically positioned between a utility power meter 202 and an electrical power outlet 204. It should be noted that in alternative embodiments, the electronic device can function as the utility power meter. The electrical power outlet can be any suitable outlet, including a 110 V or 220 V receptacle, a light fixture outlet or any other suitable outlet. Outlet 204 may also be an electrical subpanel, load center, transformer, or other power distribution center. The electronic device 200 includes a circuit breaker 206 which is operable to cut off power to an electrical power circuit 208. It should be noted that the circuit 208 can include additional power outlets, electrical subpanels, load centers, transformers, or other power distribution centers; however, in various embodiments, each of a plurality of outlets, electrical subpanels, load centers, transformers, or other power distribution centers are associated with different smart circuit breakers so that the power being consumed at each outlet, electrical subpanels, load centers, transformers, or other power distribution centers can be specifically distinguished and recorded separately (together with its associated consumer) for billing of the consumer. The electronic device 200 also includes a communications device 210, a monitoring device 212 and an electronic circuit 214. The electronic circuit 214 can be a processor or any other suitable type of circuit. The electronic circuit 214, circuit breaker 208, communications device 210 and monitoring device 212 determine an account of a user of the electrical power circuit 214. The electronic device 200 also determines from the account whether to supply power to the electrical power circuit 214. Additionally, if power is supplied to the electrical power circuit, the electronic device 200 charges the account and activates the circuit breaker 208 if the monitoring device 212 detects an undesirable power condition. The undesirable power condition can be any suitable condition of any suitable measurement, including but not limited to those discussed above. Additionally, the electronic device 200 may measure and record any of the above discussed power and power quality metrics. In some embodiments, utility power meter 202 may also be an electronic device 200.

The communications device 210 can be a power line communication device, a cellular communications device, a telephone, RFID, WiFi, ZigBee, or other RF communication link, or any other suitable wired or wireless communications device. In some embodiments, the device 200 may contain more than one communications device 210, e.g. a power line communications link and Bluetooth. Another embodiment would use a low power AM or FM broadcast band transceiver. In this embodiment, various measured parameters, and cumulative billing status, etc would be transmitted on a periodic basis, for reception on a standard broadcast-band radio receiver. In one embodiment, the account is determined by transmitting an identifier associated with the user to a database (e.g., a database maintained by the utility, the account owner associated with the utility power meter 202 or a third party). In another embodiment, the identifier is entered by the user via a user interface. For example, a user can enter a username and/or password or any other suitable data using a keyboard, touch screen, mouse, biometric scanner, RFID scanner, smart card, or any other suitable input device, to enable the user's account to be billed for accessing the power outlet. In still another embodiment, the identifier is obtained from a card reader (wirelessly or via a wired connection), such as an RFID card reader, a magnetic strip card reader, a bar code card reader or any other suitable type of card reader. In still another embodiment, the identifier is obtained from the device drawing power (e.g., a computer, an appliance, etc.). In this embodiment, the device is able to communicate with the smart circuit breaker (e.g., via power line communications or any other suitable mechanism), and relays identifying information associated with the user or associated with the device itself, which is associated with a user in a database.

In one embodiment, if the balance of the account is below a threshold value (or otherwise triggers a threshold condition), the device 200 does not supply power to the circuit 208. Thus, a user can be required to pre-pay for power or can be prevented from receiving power if the user's credit is over extended. Further, the device 200 stops supplying power to the circuit 208 if charging the account causes a balance of the account to meet a threshold condition. Thus, when the user's account balance reaches 0 or some minimum (or maximum) allowed value, power to the user can be cut off. In one embodiment, the breaker 200 may be programmed any suitable billing and cut-off algorithm.

In one embodiment, the user can indicate (e.g., via a user interface) that the user has finished utilizing an outlet, electrical subpanel, load center, transformer, or other power distribution center (e.g., the user can log off). As a result, further use would require re-initialization by that user or another user. In another embodiment, the user is logged off (i.e., power usage at the outlet is no longer charged to the user and the outlet requires re-initialization for further use) automatically after a time period in which the outlet does not draw power (e.g., the user's device is turned off or unplugged).

In another embodiment, the smart circuit breaker can be plugged into, attached, or wired into an outlet and one or more devices can access the power circuit by plugging into, attaching, or wiring into an outlet provided by the smart circuit breaker.

In a similar embodiment, an electronic device is electrically positioned between a utility power meter and an electrical power outlet. In an alternative embodiment, the electronic device replaces the utility power meter. The electronic device includes a circuit breaker associated with an electrical power circuit, a communications device, a monitoring device, and an electronic circuit. The electronic circuit is operable with the circuit breaker, the communications device and the monitoring device to identify a user of the electrical power circuit, supply power to the electrical power circuit after the user is identified, attribute to the user an amount of power usage based on the power supplied to the electrical power circuit after the user is identified, and activate the circuit breaker if the monitoring device detects an undesirable power condition.

The communications device can be a power line communication device or any other suitable communications device, including but not limited to those discussed above. The electronic device (or smart circuit breaker) can identify the user by transmitting an identifier associated with the user to a database or in any other suitable manner. In one embodiment, the identifier is entered by the user via a user interface of any suitable type. In still other embodiments, the identifier is obtained from a card reader or any other suitable identification source, including but not limited to those described above.

The electrical device can determine to not supply power to the electrical power circuit if an account balance associated with the user meets a threshold condition. The power can be cut off before or after the user begins using the electrical power circuit.

In one embodiment, the electrical power circuit is publicly accessible and the electrical power outlet, electrical subpanel, load center, transformer, or other power distribution center is associated with the electrical power circuit. For example, one or more outlets of the electrical power circuit can be located in a transportation terminal (e.g., an airport terminal), a parking facility, an office building, a restaurant, a retail facility, a book store, a government building, a college or university campus, a public park, a classroom, a recreational vehicle park, or a community association common room or facility. As a result, a member of the public can plug into the outlet (e.g., plug in their computer, a portable music player or other entertainment device, their electric car for recharging, camping equipment, a grill or any other suitable electric device), and the power used by that member of the public can be attributed to (e.g., billed to) the member of the public instead of (or via) the account associated with the utility meter that measures power consumption at that outlet, electrical subpanels load center, transformer, or other power distribution center. As a result, airports (or other publicly accessible areas in which it is common for members of the public to utilize available outlets) can reduce their electrical expenses by requiring those using the outlets to pay for the power they consume.

Figure 3:
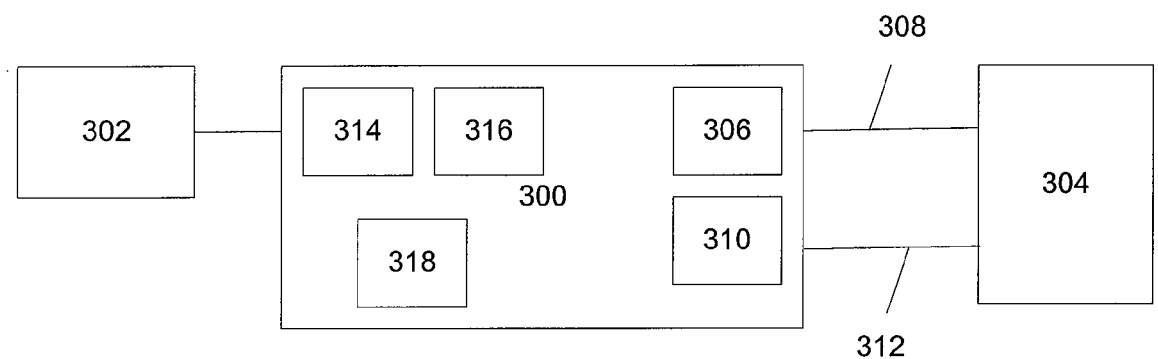
FIG. 3 is a block diagram of a smart circuit breaker system in accordance with one embodiment.

FIG. 3 illustrates an electronic system 300 which is electrically positioned between a utility power meter 302 and a plurality of electrical power outlets 304 in accordance with one embodiment. It should be noted that the system 300 can replace the utility power meter 302 in various alternative embodiments. The system 300 includes a first circuit breaker 306 associated with a first electrical power circuit 308, a second circuit breaker 310 associated with a second electrical power circuit 312, a communications device 314, a monitoring device 316, and an electronic circuit 318. The system identifies a user of the first electrical power circuit 308, attributes to that user (e.g., bills) an amount of power usage based on the amount of power supplied to the first electrical power circuit 308. The system 300 also attributes to the user an additional amount of power usage based on the amount of power supplied to the second electrical power circuit 312 and the number of other users using second electrical power circuit 312. The system 300 can also activate the first circuit breaker 306 if an undesirable power condition is detected for the first electrical power circuit 308, and activate the second circuit breaker 310 if the undesirable power condition is detected for the second electrical power circuit 312.

For example, in one embodiment, the system is utilized in a college dorm room's power system. A first student may plug a computer into a first outlet, causing power being supplied to the first outlet to be charged to the first student. Further, a second student may also be in the room and have another device (e.g., a stereo) plugged into a second outlet, causing power being supplied to the second outlet to be charged to the second student. The lights for the room can be connected to a circuit separate from either the first outlet or the second outlet. Thus, when the lights are on and both students are drawing power from their respective outlets, the power consumed to light the room can be charged to both students proportionately. Further, if one of the students leaves the room, that student can unplug his or her devices, resulting in any power that is consumed to light the room being charged to the other student only. Similarly, the cost of heating or cooling a room or building (or otherwise controlling a location's environment) can be shared by those identified as using power at that location.

The communications device 314 can be a power line communication device or any other suitable device, including but not limited to those described above. The system 300 can identify the user by transmitting an identifier associated with the user to a database or by any other suitable mechanism. The second electrical power circuit 312 can be associated with lighting of a location of the user, with climate control of a location of the user or with any other suitable power use, the benefits of which are typically shared by multiple users at a location.

It should be appreciated that though only a single communications device, monitoring device and electronic circuit are illustrated in FIG. 3, in other embodiments, each circuit breaker is associated with a different communications device, monitoring device and/or electronic circuit.

In various embodiments, a property owner, property manager or any other suitable entity can collect usage and/or other data from one or more smart circuit breakers using a handheld computer, PDA, laptop, cell phone or any other suitable portable or handheld device. The handheld computer or other device can communicate with the smart circuit breaker wirelessly (e.g., RFID, Bluetooth, etc.), via a dedicated wired communications link (Cat-5, USB, etc.), via power line communications or via any other suitable communications devices and/or protocols. Further, the handheld device can retrieve information from one or more smart circuit breakers individually and/or by retrieving information for two or more smart circuit breakers stored one a single smart circuit breaker. The property owner or other entity can compute billing for a tenant on the handheld or other portable device in various embodiments. As a result, the property owner, who may be billed by the utility for all power provided to the property, can accurately apportion that bill to one or more tenants or users of the property. It should be understood that the property owner can apportion the bill based on the smart circuit breaker data in any suitable manner, including adding a service fee, increasing or reducing the amount billed to a tenant by adding or subtracting an amount, or increasing or decreasing the amount by a percentage in accordance with any suitable billing schedule.

In other embodiments, the property owner transmits data to another computing system to calculate billing based on the data stored by one or more smart circuit breakers. It should be understood that in various embodiments any suitable data can be stored and retrieved from a smart circuit breaker in any suitable manner, by any suitable entity, and used for any suitable purpose.

It should be understood that various aspects of the embodiments described above can be present in or used with other embodiments. It should also be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic device comprising:
a circuit breaker operable to cut off power to an electrical power circuit;
a communications device;
a monitoring device; and
an electronic circuit;
wherein the electronic circuit is operable with the circuit breaker, the communications device and the monitoring device to:
(i) determine an account of a user of the electrical power circuit,
(ii) determine from the account whether to supply power to the electrical power circuit, and
(iii) responsive to determining to supply power to the electrical power circuit,
(A) charge the account, and
(B) activate the circuit breaker responsive to the monitoring device detecting an undesirable power condition; and
wherein the electronic device is configured as a circuit breaker replacement positioned in a panel or sub-panel of the electrical power circuit, replaces a breaker in the panel or sub-panel, and meters power provided to the electrical circuit downstream of the panel or sub-panel in which the circuit breaker replacement is positioned;
wherein the communications device, the circuit breaker, the monitoring device and the electronic circuit of the electronic device are self-contained and physically replace the breaker.

2. The electronic device of claim 1, wherein the communications device is a power line communication device.

3. The electronic device of claim 1, wherein the electronic circuit is operable with the circuit breaker, the communications device and the monitoring device to determine the account by transmitting an identifier associated with the user to a database.

4. The electronic device of claim 3, wherein the identifier is entered by the user via a user interface.

5. The electronic device of claim 3, wherein the identifier is obtained from a card reader.

6. The electronic device of claim 1, wherein the electronic circuit is operable with the circuit breaker, the communications device and the monitoring device to determine to not supply power to the electrical power circuit responsive to determining that a balance of the account is below a threshold value.

7. The electronic device of claim 1, wherein the electronic circuit is operable with the circuit breaker, the communications device and the monitoring device to stop supplying power to the electrical power circuit responsive to determining that charging the account causes a balance of the account to meet a threshold condition.

8. The electronic device of claim 1, wherein the electronic device is configured to operate at least partly as a utility power meter.

9. The electronic device of claim 1, wherein electrical power circuit is further configured to measure a power quality of the power supplied and activate the circuit breaker responsive to measuring an out of range power quality parameter.

10. An electronic device comprising:
a circuit breaker operable to cut off power to an electrical power circuit;
a communications device;
a monitoring device; and
an electronic circuit;
wherein the electronic circuit is operable with the circuit breaker, the communications device and the monitoring device to:
(i) identify a user of the electrical power circuit,
(ii) supply power to the electrical power circuit after the user is identified,
(iii) attribute to the user an amount of power usage based on the power supplied to the electrical power circuit after the user is identified, and
(iv) activate the circuit breaker responsive to the monitoring device detecting an undesirable power condition;
wherein the electronic device is a circuit breaker replacement positioned in a panel of the electrical power circuit, replaces a breaker in the panel, and meters power provided to the electrical circuit downstream of the panel in which the circuit breaker replacement is positioned;
wherein the communications device, the circuit breaker, the monitoring device and the electronic circuit of the electronic device are self-contained and physically replace the breaker.

11. The electronic device of claim 10, wherein the communications device is a power line communication device.

12. The electronic device of claim 10, wherein the electronic circuit is operable with the circuit breaker, the communications device and the monitoring device to identify the user by transmitting an identifier associated with the user to a database.

13. The electronic device of claim 12, wherein the identifier is entered by the user via a user interface.

14. The electronic device of claim 12, wherein the identifier is obtained from a card reader.

15. The electronic device of claim 10, wherein the electronic circuit is operable with the circuit breaker, the communications device and the monitoring device to determine to not supply power to the electrical power circuit responsive to determining that an account balance associated with the user meets a threshold condition.

16. The electronic device of claim 10, wherein the electrical power circuit is publicly accessible and an electrical power outlet is associated with the electrical power circuit.

17. The electronic device of claim 16, wherein the electrical power outlet is located in a transportation terminal, an airport terminal, a parking facility, an office building, a restaurant, a retail facility, a book store, a government building, a college or university campus, a public park, a recreational vehicle park, or a community association common room or facility.

18. The electronic device of claim 10, wherein the electronic device is configured to operate at least partly as a utility power meter.

19. The electronic device of claim 10, wherein the electrical power circuit is further configured to measure a power quality of the power supplied and activate the circuit breaker responsive to measuring an out of range power quality parameter.

* * * * *